W. A. BABBITT.
BREAD MIXER.
APPLICATION FILED APR. 9, 1909.
959,101.
Patented May 24, 1910.
2 SHEETS—SHEET 1.
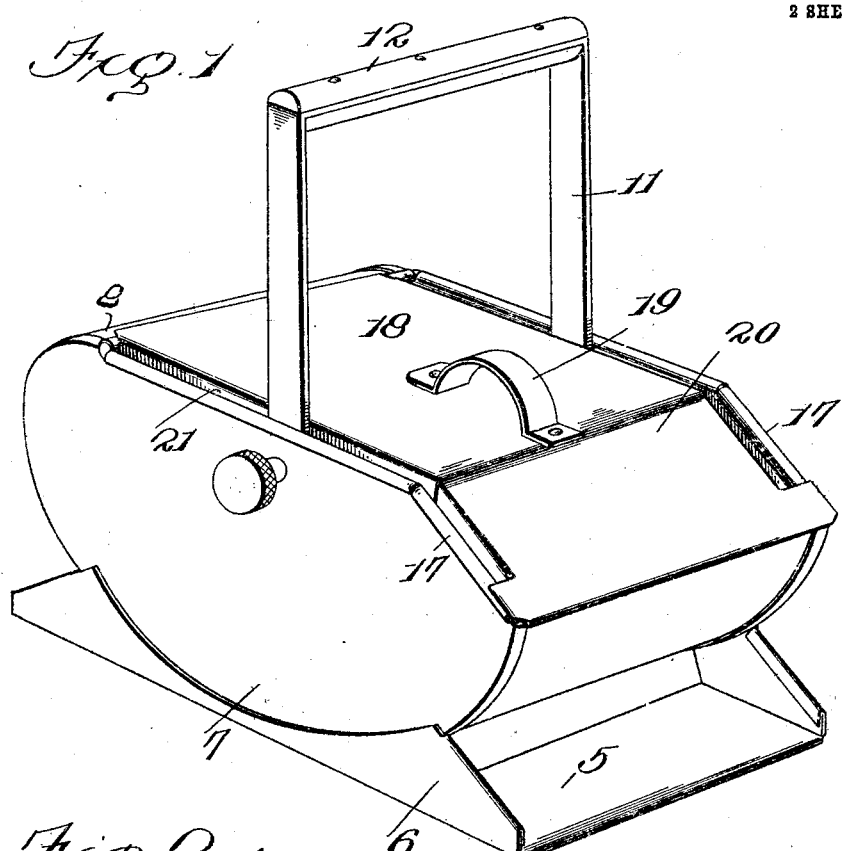
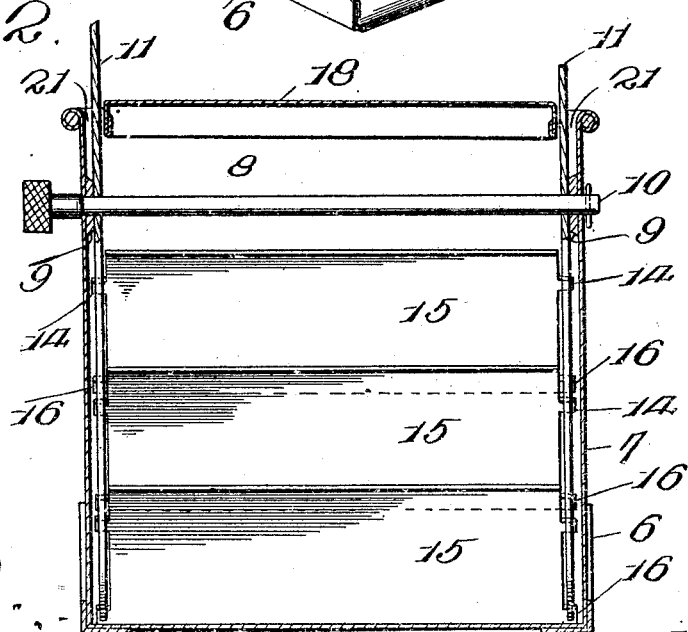

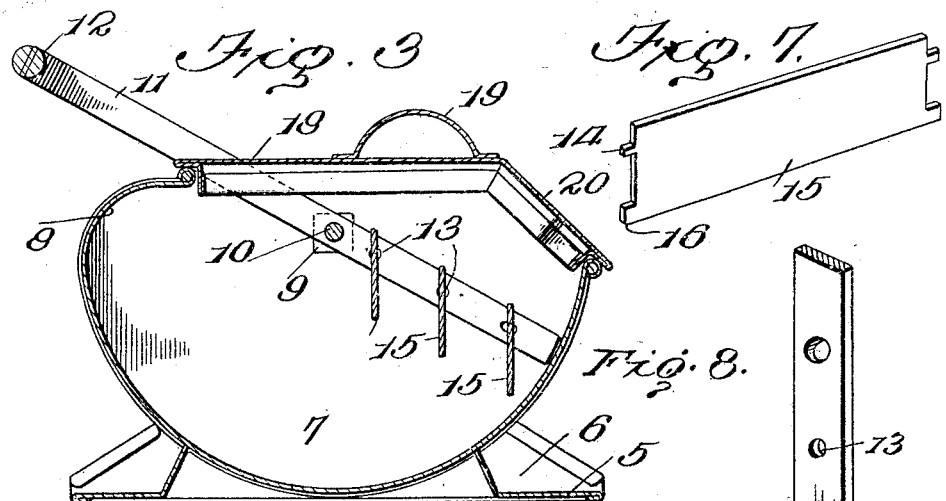
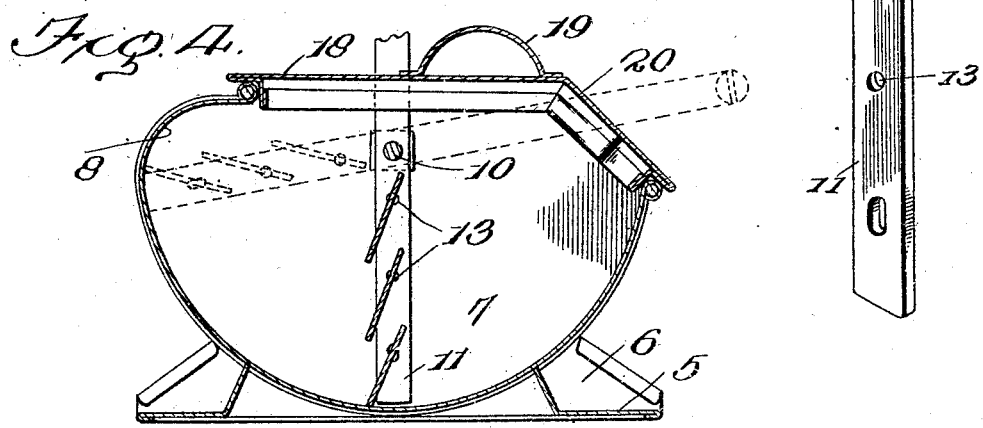
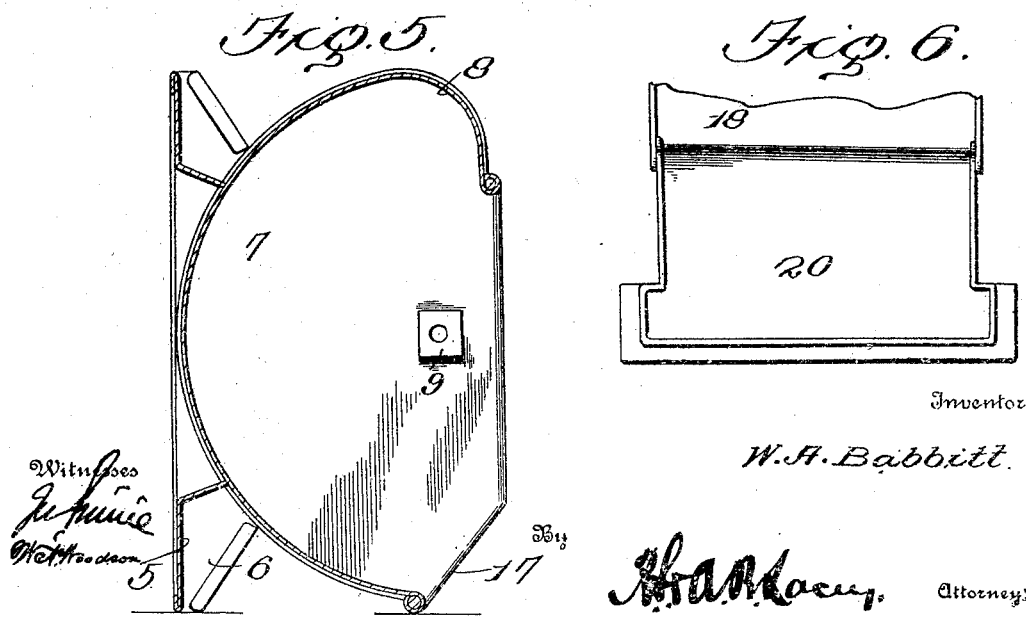

UNITED STATES PATENT OFFICE.

WILLIAM A. BABBITT, OF LOCKPORT, NEW YORK.

BREAD-MIXER.

959,101. Specification of Letters Patent. Patented May 24, 1910.

Application filed April 9, 1909. Serial No. 488,881.

*To all whom it may concern:*

Be it known that I, WILLIAM A. BABBITT, a citizen of the United States, residing at Lockport, in the county of Niagara and State of New York, have invented certain new and useful Improvements in Bread-Mixers, of which the following is a specification.

This invention relates to mixing machines, and more particularly to a machine for mixing and kneading dough, pastry and the like.

The object of the invention is to provide a comparatively simple and thoroughly efficient device of the character described, by means of which the several ingredients may be intimately mixed or blended, and the resultant dough thoroughly kneaded at one operation of the machine.

A further object is to provide a combined mixing and kneading device, including a receptacle having a kneading frame pivotally mounted for oscillation within the same and provided with a plurality of feathering blades which permit the passage of the material through said frame during the mixing operation and form a support for the mass of dough when kneading the latter.

A further object is to so arrange the pivoted blades with relation to the oscillating frame that when said frame is used for kneading the dough or materials to be mixed, the edges of the blade will press into the mass and thus act as fingers to assist in kneading the former.

A further object is to provide one end of the containing receptacle with a curved kneading surface thereby to impart a rolling motion to the dough, when the kneading frame is actuated.

A still further object of the invention is to generally improve this class of devices, so as to increase their utility, durability and efficiency, as well as to reduce the cost of manufacture.

Further objects and advantages will appear in the following description, it being understood that various changes in form, proportions and minor details of construction may be resorted to within the scope of the appended claims.

For a full understanding of the invention and the merits thereof, and to acquire a knowledge of the details of construction, reference is to be had to the following description and accompanying drawing, in which:

Figure 1 is a perspective view of a combined mixing and kneading machine constructed in accordance with my invention; Fig. 2 is a transverse vertical sectional view of the same; Fig. 3 is a longitudinal vertical sectional view; Fig. 4 is a similar view, the kneading frame or yoke being shown in full lines in normal position and in dotted lines in the position to effect the kneading of the dough; Fig. 5 is a longitudinal vertical sectional view showing the manner of discharging the dough from the interior of the receptacle; Fig. 6 is a bottom plan view of one end of the cover detached; and, Fig. 7 is a detail perspective view of one of the pivotal mixing blades detached; Fig. 8 is a detail side elevation of the lower portion of the kneading frame.

Corresponding and like parts are referred to in the following description and indicated in all the views of the drawing, by the same reference characters.

The improved mixing machine forming the subject-matter of the present invention, includes a supporting base 5, preferably formed of metal, and having its opposite longitudinal edges reinforced and strengthened by the provision of vertical flanges 6.

Supported on the base 5 is a substantially semi-circular receptacle 7 adapted to receive the dough or other materials to be mixed and having its forward end curved rearwardly over the top of the receptacle, to produce a kneading surface 8, which latter serves to impart a rolling motion to the mass of dough, as will be more fully explained hereinafter.

The inner walls of the receptacle are reinforced and strengthened by bearing plates 9 having perforations formed therein for the reception of a transverse shaft 10 on which is mounted for oscillation a kneading frame 11.

The kneading frame 11 is preferably in the form of a yoke, the closed end of which is provided with an operating handle 12, while the open end thereof extends within the receptacle 7 and is spaced a sufficient distance from the bottom of said receptacle to permit free oscillation of the frame within the same.

The vertical arms of the kneading frame are pierced by a plurality of spaced transverse openings 13 which receive laterally projecting lugs 14 on the feathering mixing blades 15. The mixing blades 15 are arranged in overlapped relation, and are each provided with longitudinally disposed stop lugs 16 which bear against the adjacent longitudinal edges of the yoke 11 and serve to limit the rearward pivotal movement of said blades. If desired, however, the means for limiting the swinging movement of the blades may be formed on the yoke instead of on the blades, without departing from the spirit of the invention.

Attention is here called to the fact that the mixing blades 15 are disposed at an angle or inclination to the longitudinal plane of the oscillating frame 11, thereby to present projecting edges to the mass of dough in the receiving compartment, which edges press into the dough and assist in squeezing and kneading the latter.

The openings for the bearing lugs of the lower mixing blade 15 are slightly elongated, as best shown in Fig. 8 of the drawing, so as to permit free movement of the said blade, and thus allow the latter to conform to the bottom of the receptacle and prevent any dough or other material from adhering to the bottom of said receptacle during the operation of kneading.

The upper edges of the receptacle 7 at the front end thereof, are deflected downwardly in the direction of the base 5, to form a discharge mouth 17, the lower edge of which is preferably disposed in alinement with the transverse edge of the base 5, so that when the kneading frame is removed and the receptacle positioned on end, the transverse edge of the support and the mouth of the receptacle together will sustain the weight of said receptacle and thus permit the ready discharge of the dough from the receiving compartment into a bread pan or other receptacle designed to receive the same.

Combined with the receptacle 7, is a cover 18 having a suitable handle 19 and provided with a downwardly deflected portion 20 which forms a closure for the mouth of the receptacle. The opposite longitudinal edges of the cover 18 are spaced laterally from the interior walls of the receptacle to form guiding recesses 21 for the opposite arms of the kneading frame 11, so that the latter may be readily oscillated to effect the mixing and kneading of the dough, without the necessity of removing the cover.

In using the device, the ingredients or materials of which the bread is to be formed, are placed in the receiving compartment of the receptacle 7, and the frame 11 rapidly oscillated by manipulating the handle 12. As the frame oscillates, the material will pass between the feathering blades, thereby to thoroughly mix or blend the ingredients and work the same to the consistency of dough. After the dough is formed, the handle of the kneading frame is tilted rearwardly so as to force the dough upwardly in contact with the curved kneading surface 8, the curvature of the portion 8 being such as to impart a rolling motion to the dough. As the mass of dough is carried upwardly on the pivoted blades 15, the projecting edges of said blades will press into the dough and thus simulate the fingers of the human hand, as in making bread manually.

Attention is here called to the fact that during the mixing operation, the pivoted blades are free to swing laterally on the lugs or trunnions 14 to permit the passage of the materials between the same, and that when the materials have assumed the consistency of dough, the stop lugs 16 by engagement with the adjacent edges of the frame 11 will prevent tilting movement of the blades, and thus form a support for the dough so that the latter may be carried upwardly in engagement with the kneading surface 8 when the frame 11 is tilted. It will also be noted that after the dough is carried upwardly on the blades 15 and the frame moves to the normal or vertical position within the receptacle, the mass of dough will drop by gravity onto the projecting edges of said blades, thereby to thoroughly knead the dough.

The term overlapping, as applied to the mixing blades 15, is intended to comprehend any arrangement of blades in which the lower edge of one blade extends over the upper edge of an adjacent blade a sufficient distance to form in effect a supporting platform for the dough when the swinging frame is oscillated in the act of kneading said dough.

When the device is used for mixing cake, the upper two blades 15 will be dispensed with, the mixing of the batter being effected by rapidly oscillating the frame within the receptacle, as will be readily understood.

Any suitable means may be employed for retaining the mixing blades 15 in the yoke 11, but it is preferred to make the yoke of spring metal so that the arms of said yoke will be slightly resilient and thus exert a yieldable pressure on the blades and retain the same in position on the frame, without the employment of screws and similar fastening devices.

It is obvious that the reciprocating movement of the kneading frame may be supplied from an eccentric instead of from a radial motion on a central shaft.

While the device is principally designed for mixing and kneading dough and similar materials, it must of course be understood that the same may be used with equally good results for churning butter or for other purposes, without departing from the spirit of the invention.

Having thus described the invention, what is claimed as new is:—

1. A mixer including a receptacle, a kneading frame pivotally mounted for oscillation within the receptacle, a plurality of overlapping mixing blades eccentrically mounted for pivotal movement on the kneading frame, and means for limiting the pivotal movement of the blades in one direction.

2. A mixer including a receptacle, a frame pivotally mounted for oscillation within the receptacle, mixing blades pivotally mounted between the walls of the frame and free to swing in one direction only, and means for limiting the swinging movement of the blades in the opposite direction.

3. A mixer including a receptacle, a kneading frame pivotally mounted within the receptacle and provided with resilient side bars having perforations formed therein, blades pivotally mounted between the resilient walls of the frame and provided with trunnions arranged to enter the adjacent perforations in said frame, said blades being free to swing in one direction, and means for limiting the swinging movement of the blades in the opposite direction.

4. A mixer including a receptacle, a shaft extending transversely through the receptacle, a frame mounted for oscillation on the shaft and having spaced perforations formed therein constituting bearings, a plurality of mixing blades pivotally mounted between the walls of the frame and provided with oppositely disposed trunnions engaging the adjacent bearings, and lugs extending longitudinally from the opposite ends of the blades for limiting the swinging movement thereof.

5. A mixer including a receptacle, a frame mounted for oscillation within the receptacle, and a plurality of feathering mixing blades pivotally mounted between the walls of the frame and disposed in overlapped relation.

6. A mixer including a receptacle, a frame mounted for oscillation within the receptacle, and a plurality of flat overlapping blades pivotally mounted between the walls of the frame and disposed at an angle to the longitudinal plane of said frame, thereby to present projecting edges to the materials being operated upon.

7. A mixing machine including a receptacle having one end thereof curved upwardly and rearwardly to form a kneading surface, a kneading frame mounted within the receptacle, and a plurality of overlapping blades eccentrically mounted for pivotal movement between the walls of the frame and disposed at an angle to the longitudinal plane of said frame for forcing the material against the kneading surface.

8. A mixing machine including a receptacle having an opening and provided with an upwardly and rearwardly curved wall forming a partial closure for said opening, one end of the receptacle being cut away to form a discharge mouth, a cover provided with a downwardly deflected portion forming a closure for the mouth of the receptacle, and a frame pivotally mounted for oscillation within the receptacle and provided with a plurality of mixing blades, the side walls of the cover being spaced from the interior walls of the receptacle to form guiding recesses for the reception of the oscillating frame.

9. A mixing machine including a supporting base, a receptacle secured to the base and having one end thereof curved upwardly and rearwardly to form a kneading surface, and its other end provided with a discharge mouth, a frame mounted for oscillation within the receptacle and provided with a plurality of mixing blades, a cover provided with a deflected portion forming a closure for the mouth of the receptacle and having its side walls spaced from the receptacle to form guides for the oscillating frame, the mouth of the receptacle and one end of the base being disposed in substantially vertical alinement with each other.

10. A mixer including a receptacle, a frame mounted for oscillation within the receptacle and having vertically disposed slots formed therein and constituting bearings, and a feathering mixing blade pivotally mounted in said slots and having a limited vertical movement.

11. A mixer including a receptacle, a frame mounted for oscillation within the receptacle, and a series of feathering mixing blades pivotally mounted in the frame, the lowest blade in the series having a limited vertical movement.

12. A mixer including a receptacle, a frame mounted for oscillation within the receptacle and provided with transversely alined vertically disposed slots constituting bearings, a pivoted mixing blade provided with trunnions journaled in the slots and having a limited vertical movement and means for limiting the pivotal movement of the blade in one direction.

In testimony whereof I affix my signature in presence of two witnesses.

WILLIAM A. BABBITT. [L. S.]

Witnesses:
Wm. S. Caton,
Mary G. White.